Sept. 12, 1939.                    N. M. COUTY                    2,172,650
                         MALE SWIVEL NUT CONNECTION
                           Filed Aug. 22, 1938            2 Sheets-Sheet 1
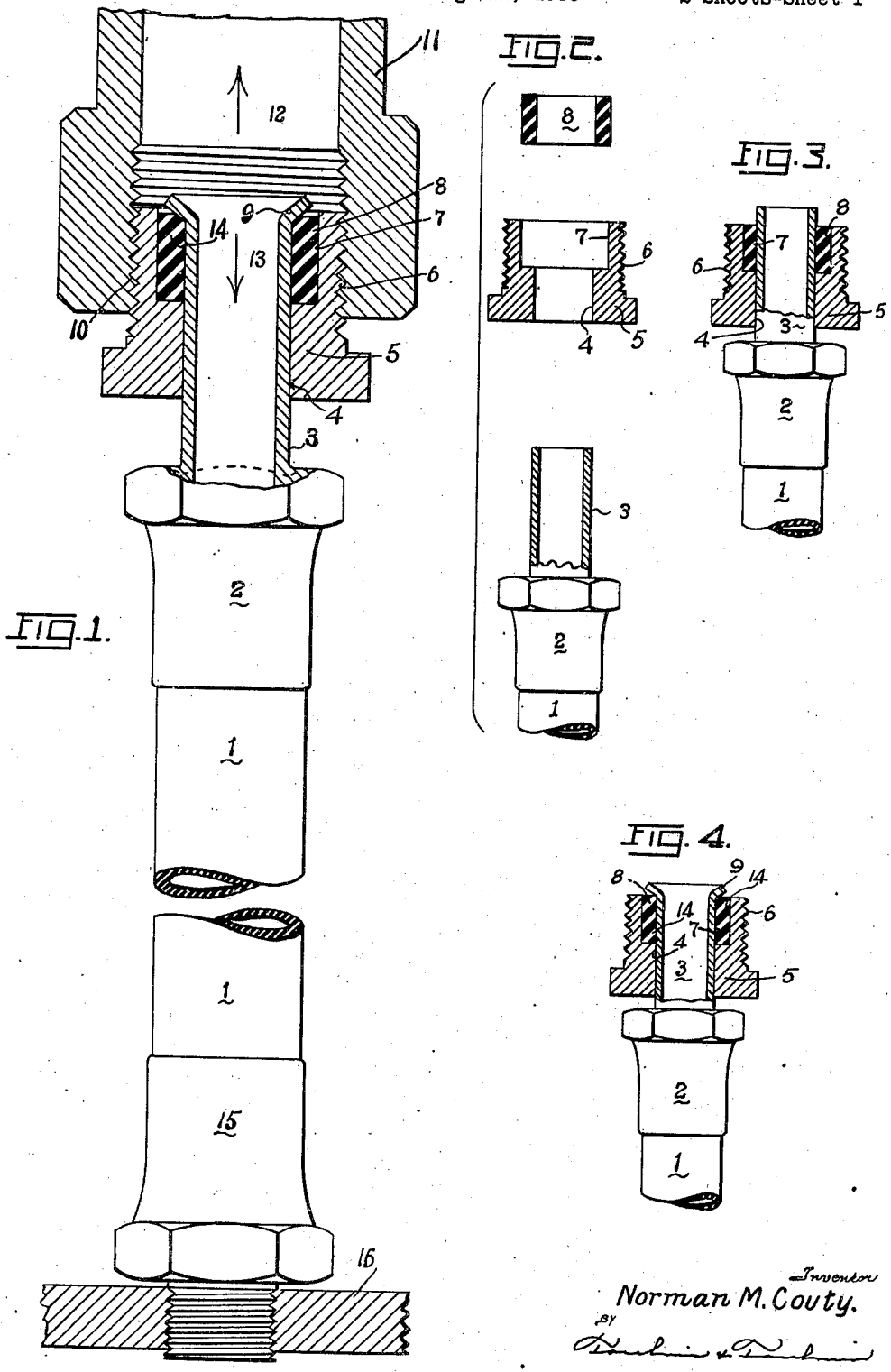
Inventor
Norman M. Couty.

Sept. 12, 1939.　　　　　N. M. COUTY　　　　　2,172,650
MALE SWIVEL NUT CONNECTION
Filed Aug. 22, 1938　　　2 Sheets-Sheet 2

Norman M. Couty,
Inventor

Patented Sept. 12, 1939

2,172,650

UNITED STATES PATENT OFFICE 2,172,650

MALE SWIVEL NUT CONNECTION

Norman M. Couty, Detroit, Mich., assignor to The Flex-O-Tube Company, Detroit, Mich., a corporation of Delaware Application August 22, 1938, Serial No. 226,087

4 Claims. (Cl. 285—97.5)

This invention relates to couplings and in particular to swivel nut connections.

This invention has for its object the provision of a device which may be used to connect rigid or flexible pipes and tubes in such a way that a strong, leak-proof joint is obtained without disturbing the pipes or requiring them to rotate when the joint is being made up.

All existing joints of this type require the use of specially formed seats or faces, or the use of extra parts or adapters having specially formed seats or faces. Such joints are expensive, bulky, and inconvenient to use where time and space are important factors.

The bodies of many engines and machine parts are drilled and tapped with standard female pipe threads wherever a tube or pipe connection is to be made. This type of thread is cheap and simple to cut and has been accepted as standard by manufacturers of automobiles, machinery, plumbing fixtures, etc. Due to the quantities of such parts it is highly desirable that a convenient method of connecting pipe lines or tubes be provided. The use of adapters or of special seats is, therefore, an encumbrance which should be dispensed with, if possible.

My invention relieves this condition by eliminating the necessity of special seats and adapters. The swivel nut fits directly into the tapped hole to form a fluid-tight joint which will allow relative rotational movement of the connected parts under normal hydraulic pressures.

It is my object to provide a swivel connection forming a fluid-tight joint which will allow relative movement of the connective parts under pressure, and which will allow the connection to be made up with a minimum of expense and effort.

Referring to the drawings:

Figure 1 is a slide elevation, partially in section, of a hydraulic hose and a male swivel nut connection in one and shown in section.

Figure 2 shows the swivel parts of the connection in disassembled condition.

Figure 3 shows the same parts in partially assembled condition.

Figure 4 shows the same parts in a completely assembled condition.

Figure 5:
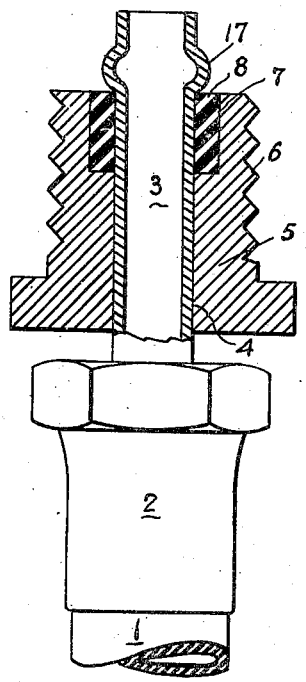
Figure 5 illustrates a modification in which an annular bead has been extended around the surface of the male member.

Referring to the drawings in detail, I designates a hose on which is mounted a coupling 2 having an extended male member 3 in the form of a relatively thin tube. This tube is inserted within the bore 4 of the male nut body 5 which is externally threaded at 6. The bore 4 is enlarged into an enlarged bore at 7 in which is mounted a sealing gasket 8 of leather, fibre, rubber, synthetic rubber, wicking, etc., which serves to seal the joint against leaks. The outer end of the tube 3 is turned over at 9 so that this end bears on the gasket 8 and forms a seal.

The nut 5 is threaded into the threads 10 of the pipe 11.

The pressure within the piping system thus assembled exerts a force in the direction indicated by the arrows 12 and 13. This force acts to separate the various components of the coupling. The pipe 11 is acted upon in an upward direction. The tube 3 is acted upon by an equal and opposite force which tends to displace it in a downward direction. This movement causes the flared zone 9 to bear against the relatively soft, resilient, yielding or plastic gasket to produce a zone of compression within the gasket in the area generally designated 14. As a result, the gasket is tightly packed in the recess 7 of the nut 5 and is forced against the exterior of the stem or tube 3. The greater the pressure, the greater the sealing effect so that the ability of the coupling to withstand pressures automatically increases with the increase of the pressure. Thus the fundamental object of this invention is accomplished of affording a simple and cheap means of joining pipe lines and of providing the rotating swivel coupling. The stem 3 is free to rotate in the nut 5 at all times. For instance, as the other end of the hose is connected by the coupling 15 to some support such as 16 that rotates or oscillates, then the tube 3 may likewise move without disturbing the joint. This takes place regardless of the pressure conditions existing within the system. Thus a swivel or swing joint is provided when desired. It is generally desirable to unite the pipe 11 and the hose 1 with its coupling 2 without causing either to rotate. In making the connection, the nut 5 is rotated on the stem or tube 3 until its threads 6 have engaged with the threads 10 of the pipe 11. This effects ultimately a fluid-tight joint. Thus the parts 1 and 11 are not required to rotate or take part in the turning necessary to engage these threads.

Figure 6:
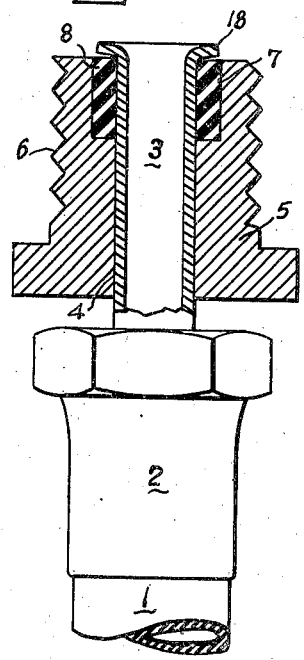
Figure 6 is another modification showing the male member with a flanged head.
Figure 7:
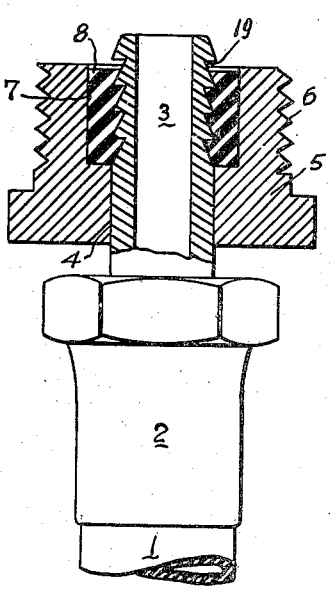
Figure 7 is another section showing a male member with a corrugated surface.

There are a variety of other means of securing a stem in position. For instance, in Figure 5 there is provided an annulus 17, in Figure 6 a flared end of the tube as at 18 and in Figure 7 a tube is provided with a series of sharp-edged corrugations 19 which engage with the rubber body of the sealing gasket 8.

Figure 8:
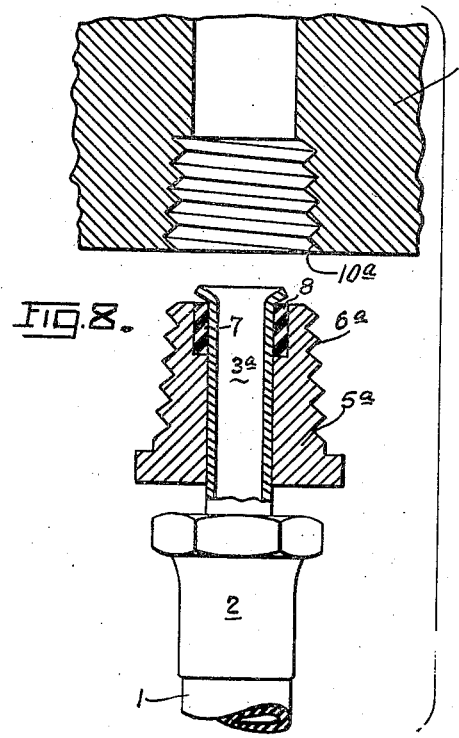
Figure 8 is a view of a modified form using a tapered nut with the parts in disassembled condition.
Figure 9:
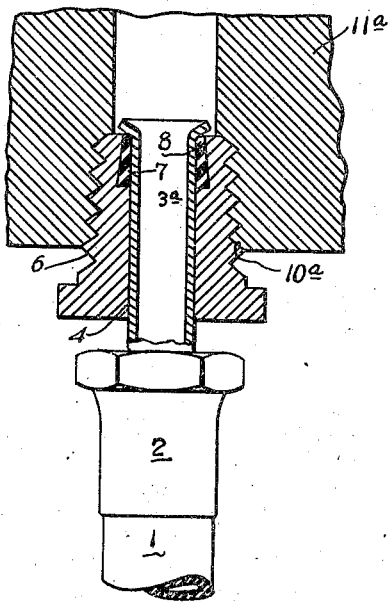
Figure 9 is a similar view of the construction of Figure 8 in its assembled condition.

In Figures 8 and 9 there is shown a nut 5a with tapered threads 6a which fit within similarly tapered threads 10a of the pipe 11a. When this nut is so threaded it tends to clamp the pipe 3a to increase the effectiveness of the connection. As the nut is gradually screwed into the tapered thread, the nut is crimped radially inwardly around the tube. This establishes a zone of compression within the gasket as shown in Figure 9 in order to force the gasket material into a tight driving engagement with the surface of the tube 3a.

It will be understood that there are a variety of modifications of the construction which can be employed to practice this invention. It will be further understood that the construction of this invention may be employed at one or both ends of a coupling and with or without a resilient hose member 1.

It will be understood that I desire to comprehend within my invention such modifications as come within the scope of the claims and the invention.

Having thus fully described my invention, what I claim is new and desire to secure by Letters Patent, is:

1. In combination in a coupling for a hose having a relatively thin wall, a tubular extension with an outwardly flared end, a freely slidable nut mounted upon said tubular member and having a chamber therein adjacent the tubular member, a yielding gasket within said chamber sealingly engaging said tubular member and retainingly engaged by said outwardly flared end, a conduit and means on said nut for securing the nut to an end of said conduit, said tubular extension being loosely mounted in said nut for free pivotal rotation relatively to said nut, said gasket and said conduit.

2. In combination in a coupling, a tubular extension having an outwardly flared end of substantially the same thickness as the adjoining portions of said tubular extension, an annular yielding gasket disposed around said extension, a nut having a bore for receiving said tubular extension and an enlarged bore for receiving an annular gasket, a conduit, and means for securing said nut to an end of said conduit, said tubular extension being loosely mounted in said nut for free pivotal rotation relatively to said nut, said gasket and said conduit.

3. In combination in a coupling, a tubular extension with an outwardly flared head, a nut mounted thereon having an annular chamber, a gasket surrounding the tubular extension and within said chamber, said nut having a tapered threaded exterior portion, a receiving conduit having a tapered interiorly threaded portion which is adapted to progressively crimp the nut radially inward so as to clamp the nut upon the gasket and the gasket upon the tubular extension whereby to establish a zone of compression within the gasket to insure a tight seal, said tubular extension being loosely mounted in said nut for free pivotal rotation relatively to said nut, said gasket and said conduit.

4. In combination in a coupling, a tubular member with an outwardly flared end, a gasket mounted thereon and a tapered contractible nut adapted to carry said gasket mounted on said tubular member and a conduit having correspondingly tapered means for receiving and contracting said nut when it is mounted therein whereby to form in the gasket a zone of compression around the tubular member.

NORMAN M. COUTY.